Jan. 12, 1965
S. CROSBY
3,164,930
TOOL GRINDING MACHINE
Filed Oct. 18, 1961
8 Sheets-Sheet 1
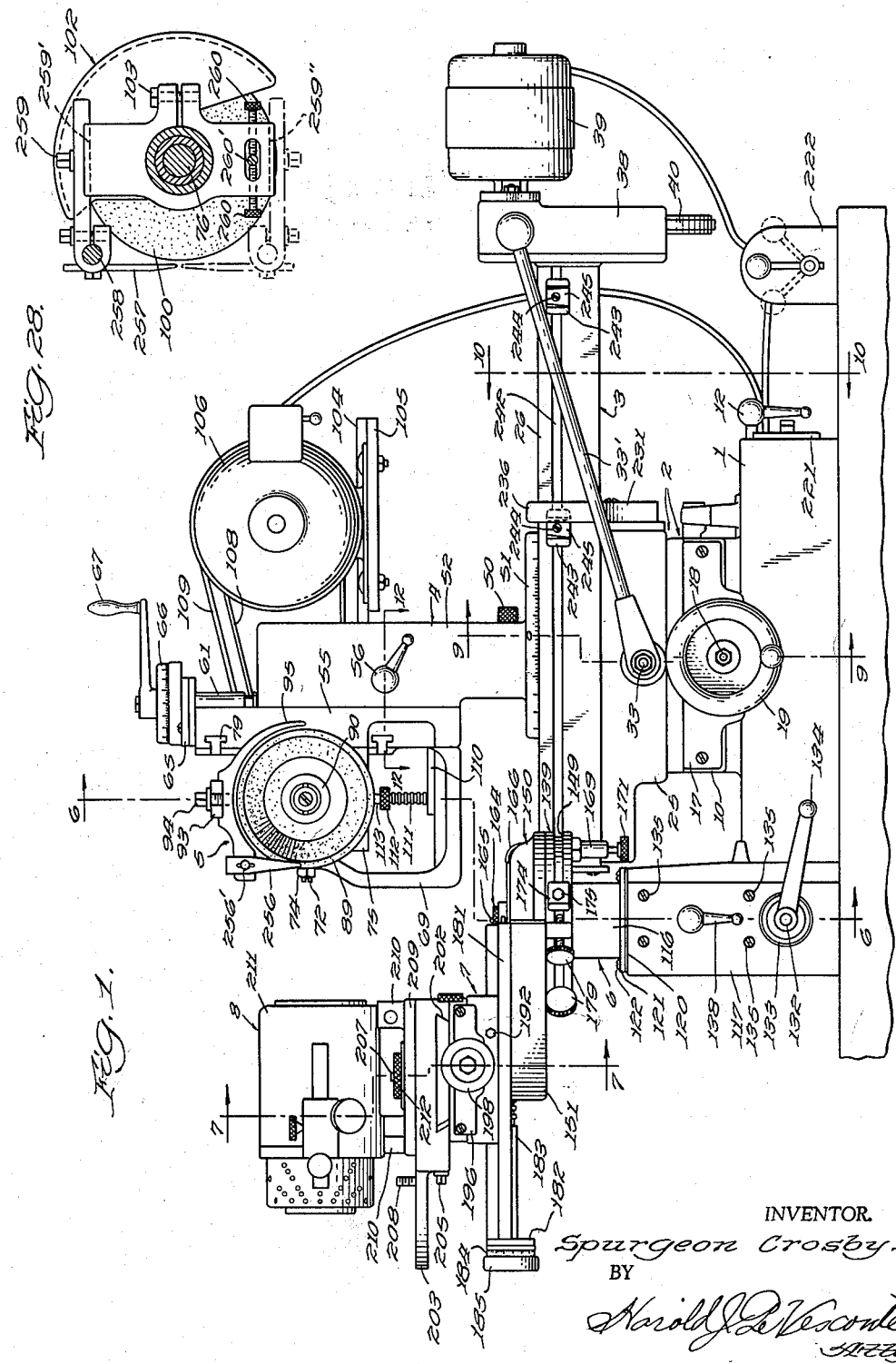
INVENTOR.
Spurgeon Crosby.
BY
Harold J. LeVesconte
Attys.

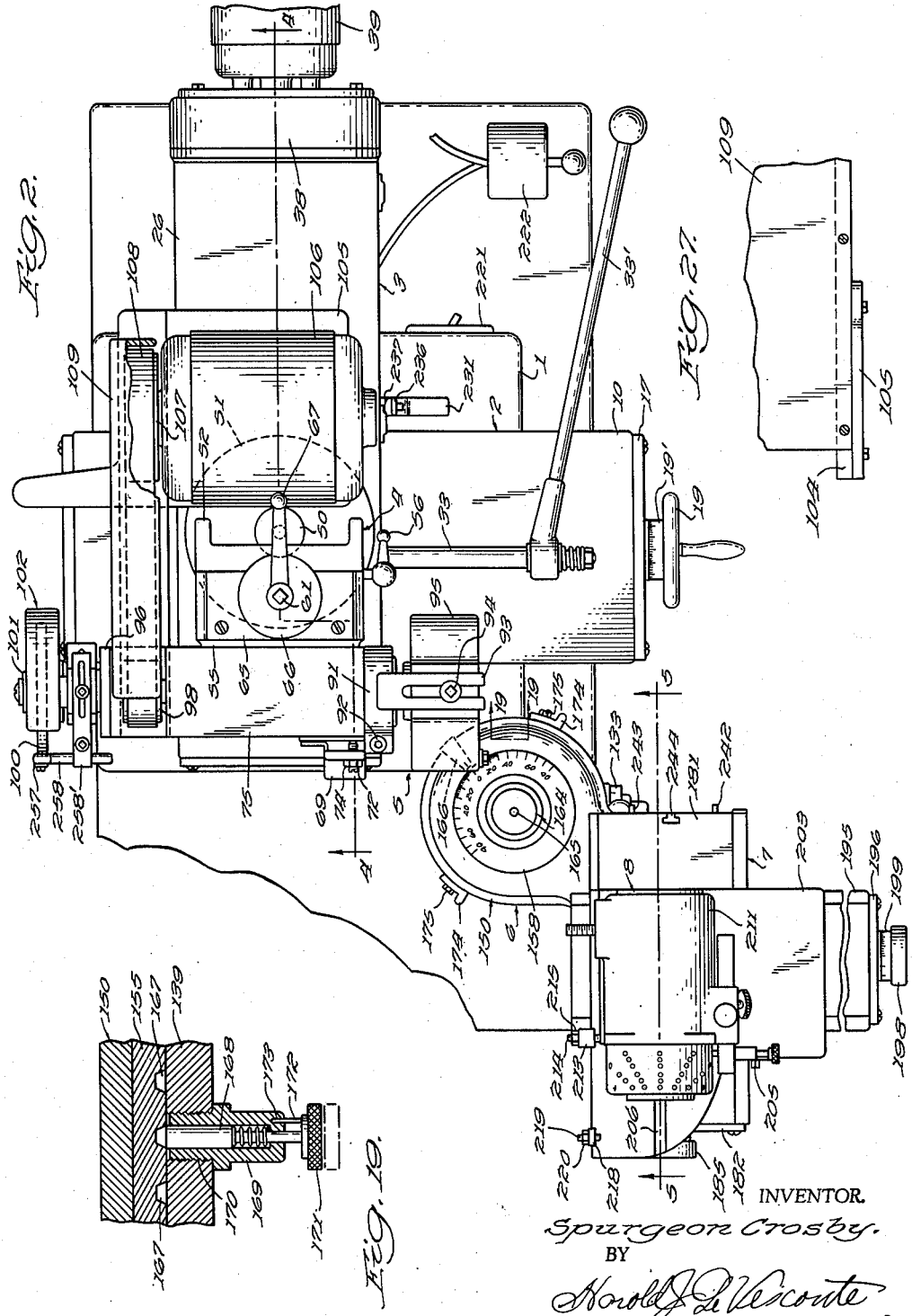

Jan. 12, 1965
S. CROSBY
3,164,930
TOOL GRINDING MACHINE
Filed Oct. 18, 1961
8 Sheets-Sheet 3
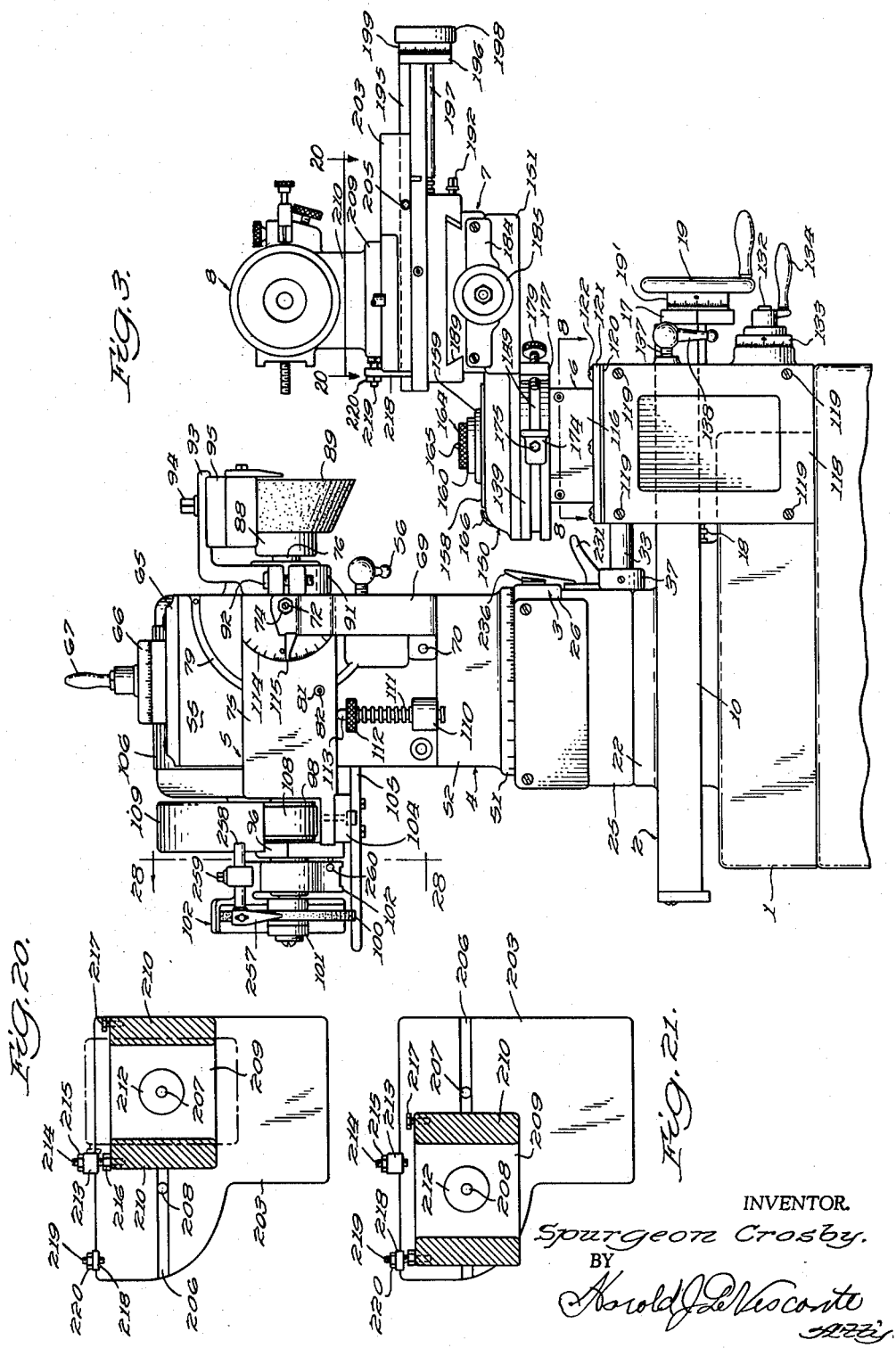
INVENTOR.
Spurgeon Crosby.
BY
Harold J. DeVisconte
ATTY.

Jan. 12, 1965
S. CROSBY
3,164,930
TOOL GRINDING MACHINE
Filed Oct. 18, 1961
8 Sheets-Sheet 4
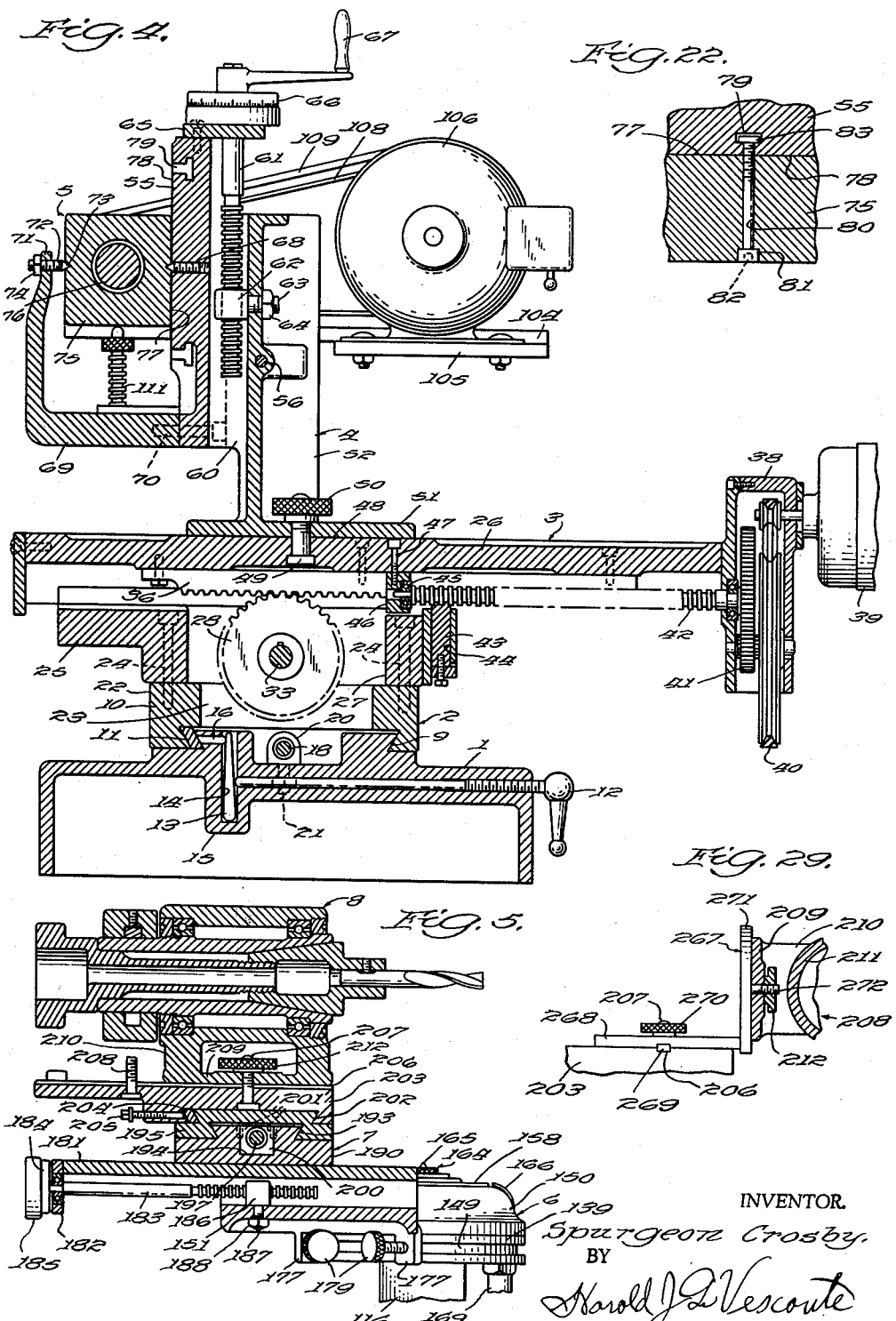
INVENTOR.
Spurgeon Crosby.
BY
Harold J. LeVescomte
Atty.

Jan. 12, 1965
S. CROSBY
3,164,930
TOOL GRINDING MACHINE
Filed Oct. 18, 1961
8 Sheets-Sheet 5
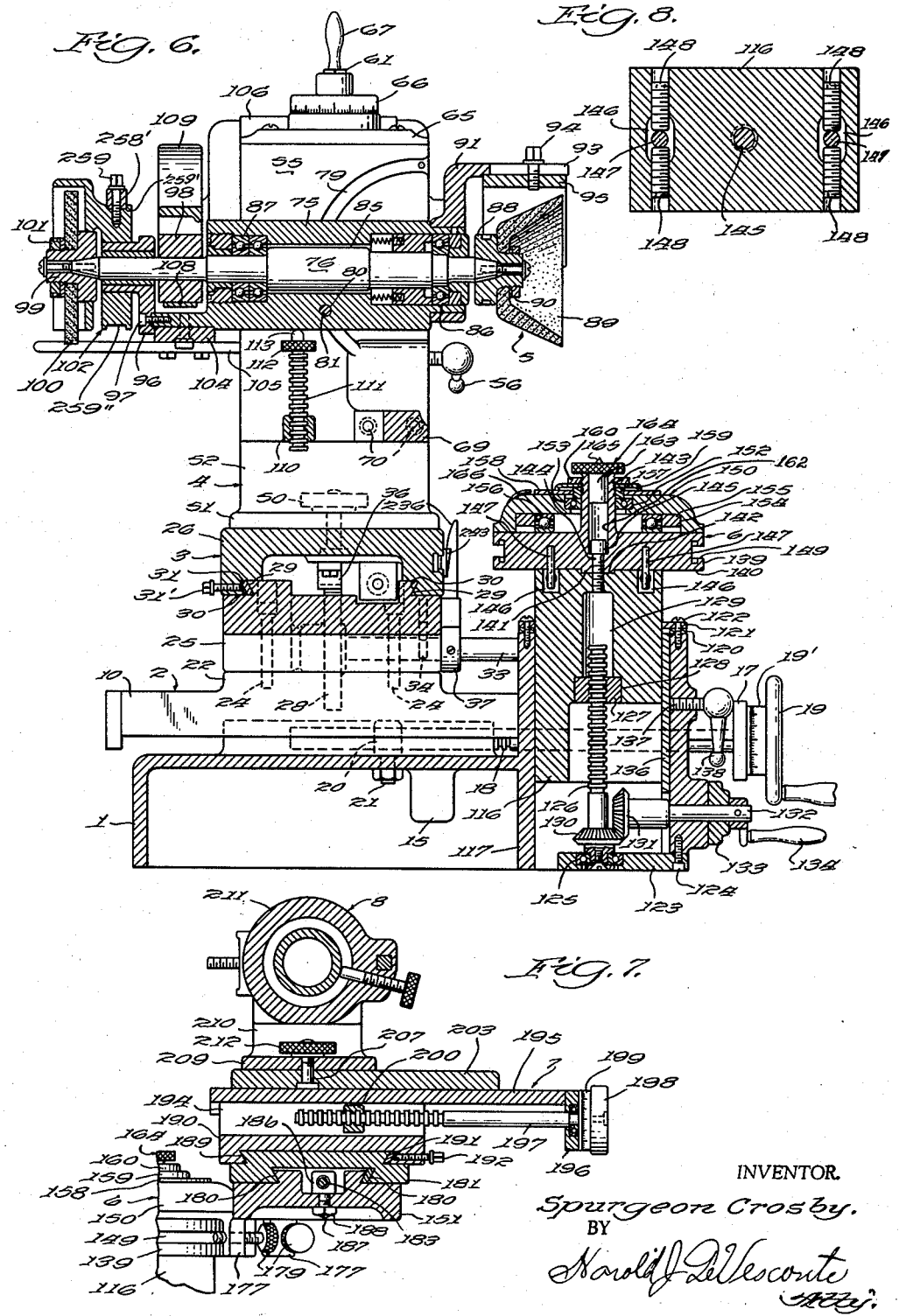
INVENTOR.
Spurgeon Crosby.
BY
Harold J. DeVesconte Jan. 12, 1965  S. CROSBY  3,164,930
TOOL GRINDING MACHINE
Filed Oct. 18, 1961  8 Sheets-Sheet 6
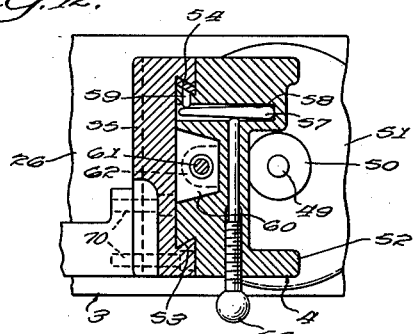
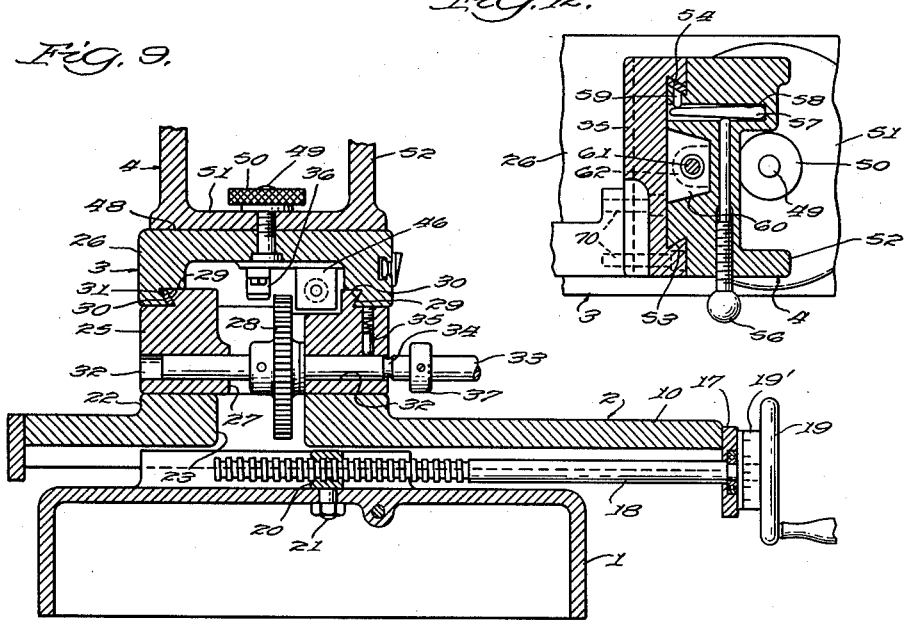
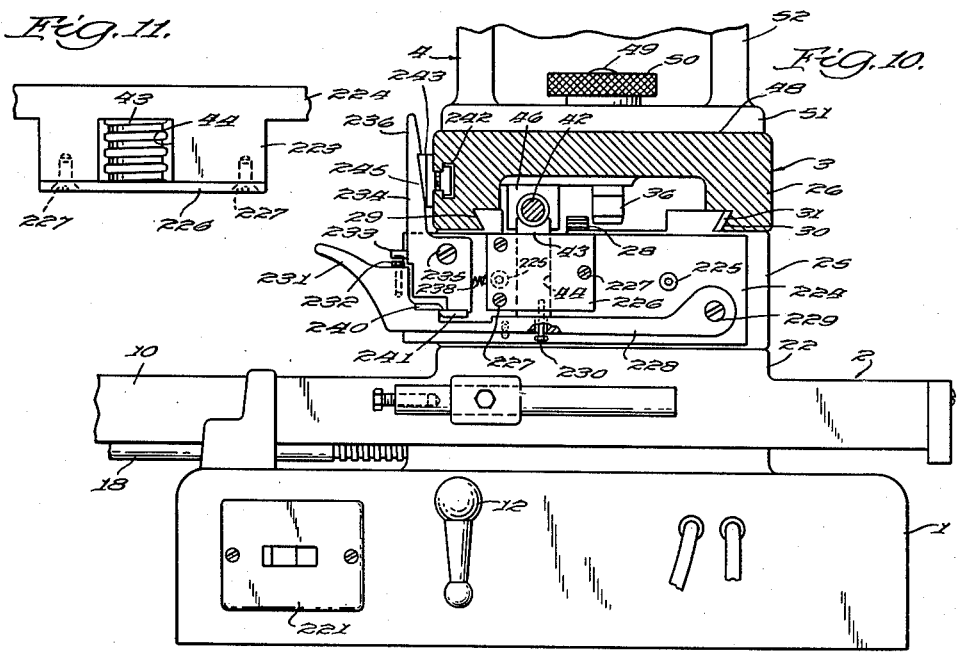
INVENTOR.
Spurgeon Crosby.
BY
Harold J. LeVesconte
Atty.

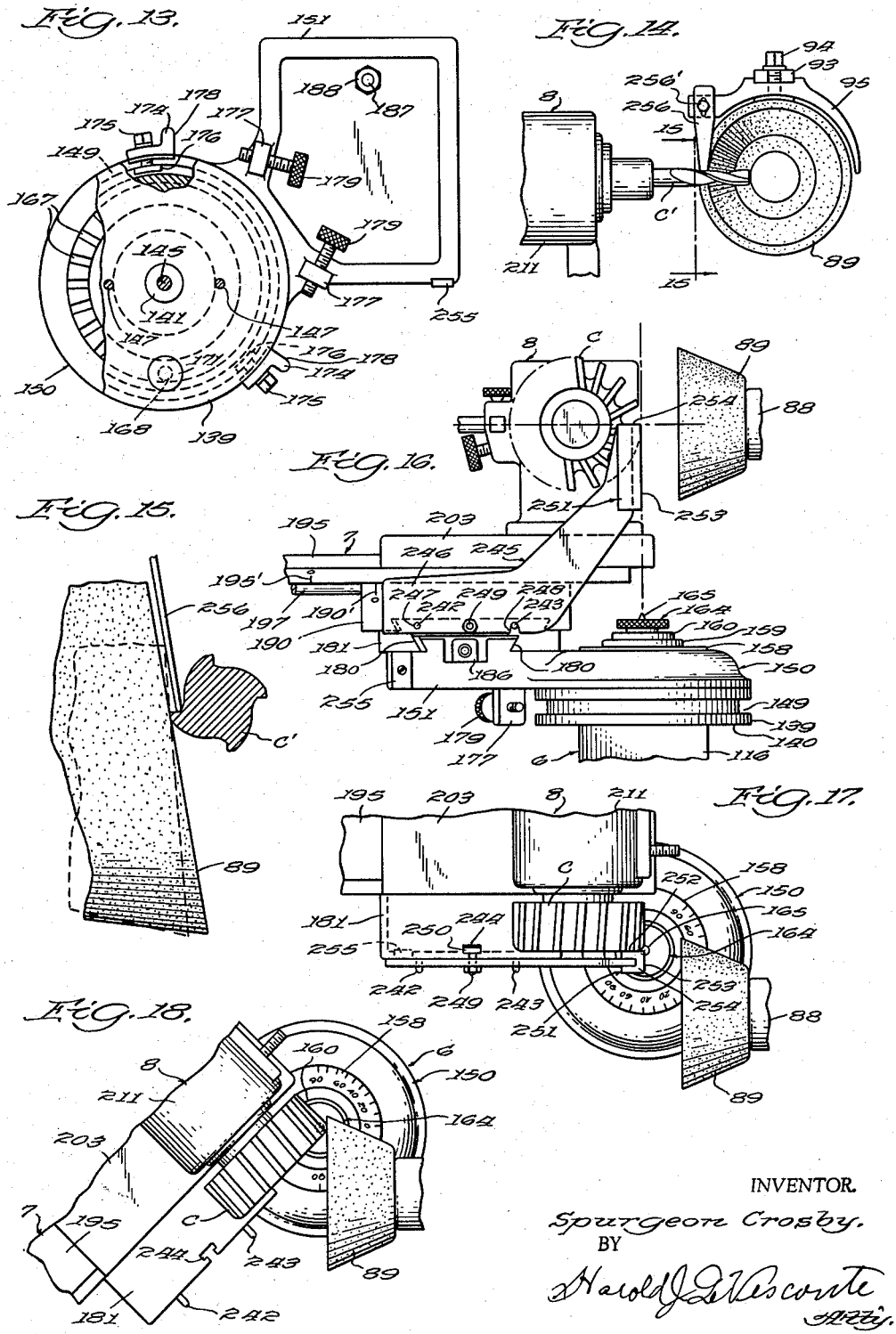

Jan. 12, 1965  S. CROSBY  3,164,930
TOOL GRINDING MACHINE
Filed Oct. 18, 1961  8 Sheets-Sheet 8
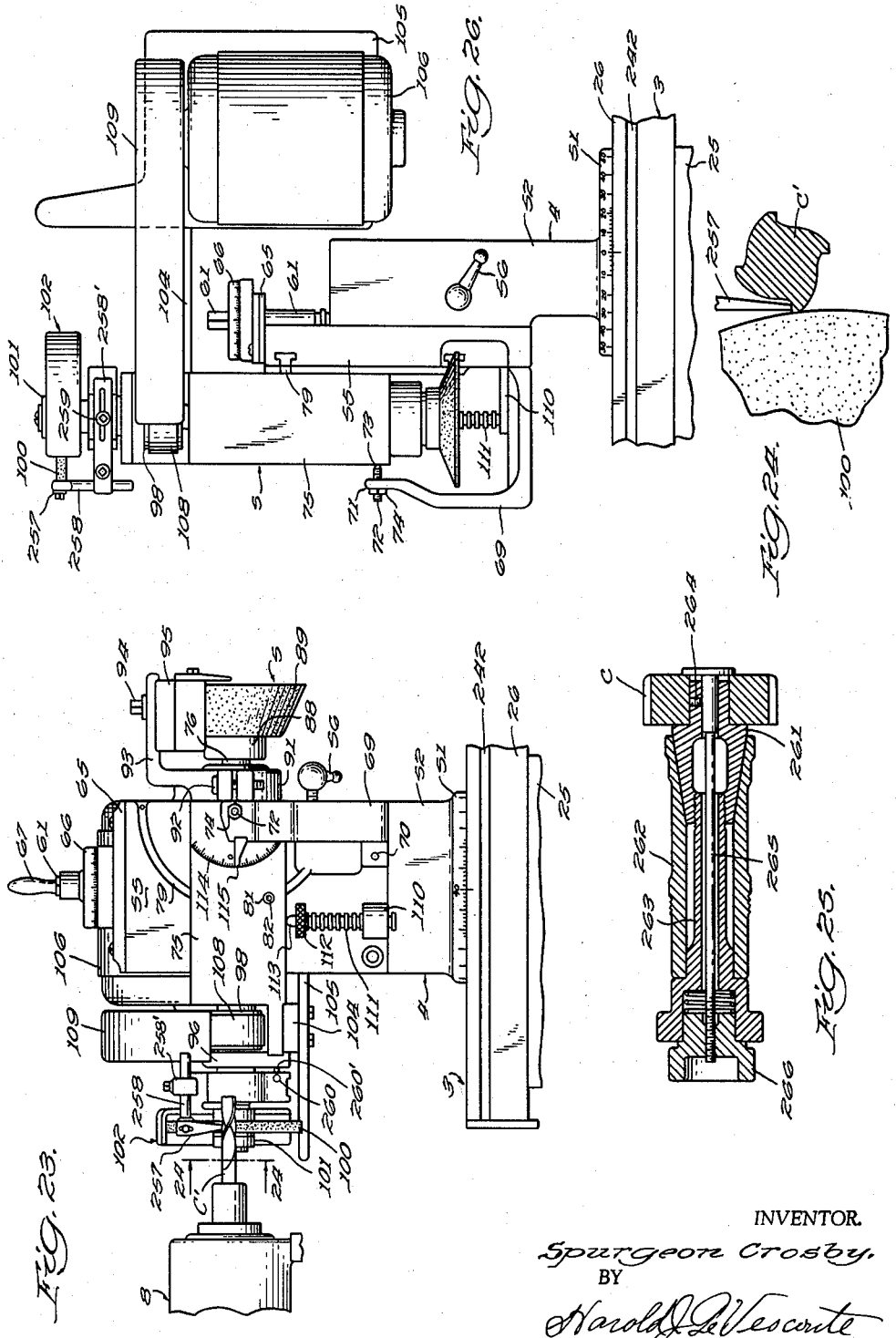
INVENTOR.
Spurgeon Crosby,
BY
Harold J. LeVescorte
Atty.

United States Patent Office 3,164,930
Patented Jan. 12, 1965

3,164,930
TOOL GRINDING MACHINE
Spurgeon Crosby, 4916 San Fernando Road,
Glendale, Calif.
Filed Oct. 18, 1961, Ser. No. 145,792
39 Claims. (Cl. 51—3)

This invention relates to tool grinding machines and more particularly to a machine for grinding milling cutters, end mills, ball end mills, and the like in addition to being readily adjusted for grinding the side and end teeth of such tools is capable of being readily and accurately set up and adjusted to grind a radius, for example, at the juncture of a side tooth and an end tooth or on the cutting edge of any tooth.

The principal object of the invention is to provide a tool grinding machine for milling cutters, end mills, ball end mills and like tools in which both the grinding wheel mounting means and the tool holding means are separately adjustable in all directions relative to a vertical line which is maintained in fixed relation to the machine frame structure.

Another object of the invention is to provide a tool grinding machine capable of grinding radii on the teeth of milling cutters, end mills, ball end mills, and the like in which the portion of the cutter to be ground is locatable in such relation to a fixed vertical line extending from the machine frame that the tool holding means may be moved about said vertical line as an axis with the portion of the tool to be ground disposed in such relation to said axis and to a grinding wheel adjusted to a predetermined location with respect to said vertical line that an accurate radius grind which is tangent to the connected tooth faces may be achieved.

A further object of the invention is to provide a tool grinding machine in which a so-called wheel head unit comprises a wheel carrying spindle adapted to support a grinding wheel on each end thereof is mounted with its driving motor as a unit for pivotal movement about a horizontal axis through a half revolution to selected adjusted positions upon a supporting column which, in turn, is mounted for pivotal movement to selected positions about a vertical axis means carried by a ram or slide element which is reciprocable on the machine frame.

Still another object of the invention is to provide a tool grinding machine in which the grinding wheel is caused to traverse the tool edge being ground in its working stroke by power means and which is subject to manual return from the completion of each working stroke.

A still further object of the invention is to provide a tool grinding machine for milling cutters, end mills, ball end mills, and similar tools in which the grinding wheel is reciprocable in a horizontal path relative to the tool being ground incident to grinding the straight faces of the teeth of the tool and in which the grinding wheel may be locked in a desired position and the tool holding means may be oscillated about a vertical axial line maintained in fixed relation to the frame structure of the machine to grind a predetermined radius between the edges of the tooth faces connected by that radius.

With the foregoing objects in view, together with such additional objects and advantages as may subsequently appear, the invention resides in the parts, and in the construction, combination and arrangement of parts described, by way of example, in the following specification of a presently preferred embodiment of the invention, reference being had to the accompanying drawings which from a part of said specification and in which drawings:

FIG. 1 is a front elevational view of a tool grinding machine embodying the present invention, the lower portion of the base upon which the frame of the machine is supported being broken away, FIG. 2 is a top plan view of the machine shown in FIG. 1, a portion of the base and a portion of the driving motor for the wheel supporting slide or power feed being broken away to permit the machine to be shown drawn to a larger scale, FIG. 3 is an end elevation as viewed from the left hand end of FIG. 1, the scale being the same as that of FIG. 1, FIG. 4 is a slightly enlarged scale, sectional view taken on the staggered line 4—4 of FIG. 2, FIG. 5 is a sectional view through the work holder and supporting means for the work holder taken on the line 5—5 of FIG. 2, FIG. 6 is a transverse sectional view taken on the staggered line 6—6 of FIG. 1, FIG. 7 is a sectional view of the work holding means and the supporting means therefor taken on the staggered lines 7—7 of FIG. 1, FIG. 8 is a transverse section taken on the line 8—8 FIG. 3, FIG. 9 is a fragmentary, enlarged scale sectional view taken on the staggered line 9—9 of FIG. 1, FIG. 10 is an enlarged scale sectional view taken on the line 10—10 of FIG. 1, FIG. 11 is an enlarged scale, top plan view of a half nut means for engaging a leadscrew of the machine and its supporting and guiding means, FIG. 12 is a sectional view taken on the line 12—12 of FIG. 1 transversely of the grinding wheel supporting column, FIG. 13 is a bottom plan view particularly showing the bottom of the master swivel means and the bracket element extending therefrom on which the supporting means for the tool holding head is carried, FIG. 14 is a fragmentary side elevational view showing the grinding of the teeth of a small diameter end mill using a cup wheel, FIG. 15 is a greatly enlarged transverse sectional view taken as on the line 15—15 of FIG. 14 showing the grinding wheel positioned at different angles for grinding the primary and secondary clearances on the cutter teeth, FIG. 16 is an end elevational view of the work supporting means including the master swivel showing the use of a locating gage employed with the machine and positioning a cutter for grinding the side teeth and a radius on the teeth, FIG. 17 is a top plan view of the portion of the machine shown in FIG. 16 showing the cutter arranged and positioned with respect to the said gage preparatory to being adjusted to grind a radius between the side and end teeth of the cutter, FIG. 18 is a view like FIG. 17 but showing the gage removed, the cutter holding means adjusted to produce a predetermined radius and the work holding means being swung incident to the formation of the desired radius, FIG. 19 is an enlarged scale, fragmentary sectional view taken on the line 19—19 of FIG. 2 showing details of the indexing means for the master swivel components of the machine, FIGS. 20 and 21 are top plan sectional views taken on the line 20—20 of FIG. 3 showing details of adjusting the tool holding device in various positions on its supporting table, FIG. 22 is an enlarged scale detail of the means for clamping the wheel head bearing element in any desired angular position, FIG. 23 is a side elevational view of the machine showing another arrangement or positioning of the wheel head and its supporting means relative to the work support for a tool grinding operation, FIG. 24 is a greatly enlarged transverse sectional view taken on the line 24—24 of FIG. 23 illustrating the mode of obtaining suitable clearance when grinding a tool by the means shown in FIG. 23, FIG. 25 is a fragmentary view through the tool holder tool supporting means showing a novel cutter supporting adapter to support a hole type cutter on the outer diameter thereof and a shank type cutter on a concentric hole therein, FIG. 26 is a view taken from the same point relative to the machine as FIG. 23 but showing the wheel head and its driving motor swung to a vertical position for another grinding operation.

FIG. 27 is a fragmentary rear elevational view of the machine showing the mounting of the belt guard for the wheel head unit, FIG. 28 is a fragmentary rear elevational view of the wheel head unit, and FIG. 29 is a fragmentary side elevational view, partly in section, showing, by way of example, an auxiliary mounting means for the tool head.

For convenience, before starting into a detailed description of the machine, the main assembly components of the machine will first be identified. The base 1 of the machine preferably comprises a low, flat, inverted, dish-like casting of generally rectangular configuration in plan and having a top surface upon which a main cross slide assembly 2 is supported. The main cross slide assembly 2 carries a reciprocable slide 3 on which a wheel head supporting column assembly 4 is mounted for movement to selected adjusted positions about a vertical axis. Mounted for vertical adjustment on the column 4 is the wheel head assembly 5 including the grinding wheel arbor, the grinding wheel and the driving motor therefor.

The base 1 at one forward corner thereof constructed with a vertical guideway to be more specifically described on which guideway the master swivel assembly 6 is mounted for vertical adjustment, the said master swivel assembly supporting a double compound cross slide assembly 7 having provision for both free sliding lead screw operated and free sliding movements in transverse horizontal lines and on which, in turn, the tool holding means 8 for holding a cutter to be ground, hereinafter called the work head, is carried.

Base and Main Cross Slide Assembly

The base 1 on the upper surface thereof (see FIG. 4) is provided with a rearwardly extending dovetail way 9 on which a saddle 10 is slidingly mounted. Interposed between one side of the dovetail way 9 and the corresponding and complementary surface of the saddle 10 is a gib 11 which can be released and tightened by a handscrew 12 threaded into the right hand side of the base as viewed in FIGS. 1 and 4 and which extends to a vertical pin 13 resting in a bore 14 extending in a depending boss 15 in the top surface of the gib and bearing against a takeup pin 16 which engages the gib 11 through a bore extending through the left hand member of the way 9.

The outer or front end of the member 10 carries a depending bearing member 17 for the outboard end of the lead screw shaft 18 the outer end of which carries a hand wheel 19 and an indicator dial 19'. The shaft 18 extends rearwardly approximately midway between the opposite faces of the dovetail ways 9 and at its distal end is threaded to engage a nut 20 carried by a stud 21 extending through the top surface of the frame member 1. Thus, rotation of the shaft 18 in one direction will cause the main cross slide member 10 and the parts carried thereby to move rearwardly across the top of the base and reverse direction of the shaft 18 will cause the cross slide and parts carried thereby to move forwardly on the base. The handscrew 12 will serve to lock the cross slide member 10 in any desired position along the ways 9.

The upper surface of the main cross slide 10 adjacent the rear end thereof is provided with a short upwardly extending boss 22 having a rectangular opening 23 therein and secured to the top surface of this boss by screws 24 is the support and guide member 25 for the slide element 26 of the slide assembly 3. The support 25 has a hollow interior 27 which communicates with the hollow interior 23 of the boss 22 to afford clearance for a spur gear 28 to which reference will later be made.

Slide Assembly

The upper face of the support member 25 is provided with parallel spaced opposed downwardly converging way surfaces 29, 29 extending at right angles to the ways 9 which are slidingly engaged by corresponding dovetail way surfaces 30, 30 on the under face of the ram slide member 26, there being a gib 31 interposed between the rearmost ways and one or more locking screws 31' to take up the gib to eliminate any loose play between the slide and the ways 29, 29 or to lock the slide on said ways.

The support member 25 has axially aligned bores 32, 32 extending through the front and rear walls thereof affording bearing for a shaft 33 extending therethrough parallel to and above the shaft 18. The shaft 33 is both rotatable and axially movable in the bearing 32 and within the space 27 carries the gear 28 which is fixed thereto. Adjacent its forward end, the shaft 33 is provided with an annular groove 34 which yieldingly displaceably engages a spring pressed pin 35 in the forward wall of the support member 25. The slide member 26 on the under face thereof between the ways 30, 30 thereof is provided with a longitudinally extending rack 36 which is engaged by the gear when the shaft 33 is moved endwise in the bearings 32 so that the pin 35 engages the slot 34. When the shaft is moved forwardly until the hub of the gear 28 engages the forward side of the space 27 as shown in FIG. 9, the gear 28 is free of the rack 36. A stop collar 37 on the shaft 33 adjacent the forward face of the support member 25 serves to limit movement of the shaft to the left as viewed in FIG. 9 to an extent that would cause the gear to the disengaged with the rack 36. At its forward end, the shaft 33 is provided with a handle arm 33' by which the shaft 33 may be oscillated with resultant reciprocable movement of the slide member 26 on the ways 29.

At its right hand end as viewed in FIGS. 1 and 4, the slide member 26 carries a housing 38 on the outer end of which a motor 39 is mounted, said motor through a reduction gear means including a belt drive 40 and reduction gears 41 operating a lead screw 42 extending beneath the slide 26 and which engages a half nut member 43 carried in a socket 44 formed as a part of a control means to be later described in detail. At its distal end, the lead screw 42 is supported in a ball bearing 45 carried by a bracket 46 secured to the under side of the slide member 26 by any appropriate means such as the screw 47.

Wheel Head Supporting Column Assembly

The slide 26 is provided with a flat, horizontal circular bearing surface 48 on its upper face through the center of which a stud 49 projects upwardly said stud being press fitted into a hole in the slide 26. Mounted on the bearing surface 48 and secured on the stud 49 by a hand nut 50 is the pad 51 of the grinding wheel assembly supporting column 52. The front face of the pad portion 51 is provided with graduations which may register with an index mark on the slide 26 to indicate the rotative position of the column about the vertical axis of the stud 49.

The column portion 52 (see FIG. 12) on the face thereof toward the tool holding means of the machine is provided with vertically extending dovetail ways including at one side thereof a gib 54, said ways being engaged by the complementary faces of a saddle 55 which carries the wheel head motor assembly to be presently described. A handscrew 56 threaded into the front face of the column 52 and operating through a pin 57 disposed in a bore 58 in the column and having a free end engaging a pin 59 which, in turn, engages the gib 54 provides a means of locking the saddle in any desired position along the ways 53. Disposed between the faces of the ways 53, the column 52 is provided with a vertically extending groove 60 affording clearance for an adjusting lead screw 61 having a threaded distal end engaging a nut 62 carried by a stud 63 extending through the wall of the column 52 and secured by a nut 64. The upper end of the lead screw 61 extends through a bearing bracket 65 carried by the saddle 55 and carries an indicator dial 66 and a handle 67 by rotation of which, the saddle can be adjusted vertically along the ways 53.

Wheel Head and Motor Assembly

The side face of the saddle 55 opposite the ways thereof is provided with a cone point set screw 68 projecting therefrom slightly rearwardly of the front edge face of the saddle and at a point substantially midway between the upper and lower ends thereof. The lower portion of said side face of the saddle carries a bracket 69 fixed thereto by screws 70, said bracket extending outwardly laterally from said face and thence upwardly and terminating in a distal end 71 carrying a set screw 72 having a point 73 in axial alignment with the point of the set screw 68, said points being spaced from and being projected toward each other. A lock nut 74 serves to secure the set screw 72 in adjusted position.

Mounted for free swinging movement between the points of the set screws 68 and 72 is the spindle housing 75 for the grinding wheel spindle 76 which is mounted for rotation therein upon bearing means presently to be described. The housing 75 has a flat face 77 which slidingly engages a corresponding side face 78 of the saddle and the saddle has a semicircular T-slot 79 formed therein and generated about the axial line of the pivot point of the housing 75 represented by the axial line of the screws 68 and 72; the ends of the said slot terminating at the front edge face of the saddle 55. The housing 75 is provided with a transversely extending hole 80 through which the shank of a screw 81 extends; said shank terminating at the exterior face of the housing 75 in a wrench receiving socket 82. The opposite end of the screw 81 threadedly engages a nut 83 disposed in the T-slot 79, said screw, upon being tightened, serving to lock the housing 75 and all parts carried thereby in a desired adjusted position about the axis of movement determined by the cone point set screws 68 and 72 by clamping the faces 77 and 78 tightly together. A stop pin at the upper end of the slot 79 serves to limit the extent of swinging movement of the housing 75 and parts carried thereby in a clockwise direction as viewed, for example, in FIG. 6.

The housing 75 is hollow from end to end to receive the spindle 76 therein, the portion 85 of the spindle is free of engagement with the housing 75. The ends of the spindle are supported in a suitable bearing 86 disposed in the end of said housing adjacent the point of pivotal mounting of the bearing member 75 and a bearing 87 disposed at the opposite end of the housing 75. The end of the spindle adjacent the pivotal mounting of the housing 75 carries a wheel collet 88 on which a grinding wheel 89 (in the illustrated embodiment of the invention, a cup wheel) which is secured thereon by a nut 90 on the wheel collet 88. The adjacent outer end of the housing 75 is circular and carries the collar portion 91 of a guard supporting bracket mounted thereon and secured in circularly adjusted position by a clamp screw 92. The collar 91 includes a radially outwardly and thence laterally extending arm portion 93 which is slotted to receive a screw 94 which supports a combined guard and tooth positioning unit 95 about the grinding wheel 89.

The opposite end of the spindle 76 projects beyond the bearing 87 and through an outboard bearing 96 secured to the end of the housing 75 by a screw 97. Between the bearings 96 and 87, the spindle 76 carries a belt pulley 98 and beyond the outboard bearing 96 it carries a hub member 99 on which in the illustrated embodiment, a straight grinding wheel 100 is secured by nut 101. The circular exterior of the outboard bearing 96 serves as a mounting means for a wheel guard 102 secured thereon in circularly adjusted position by any suitable means such as a set screw 103.

The housing 75 extends rearwardly beyond the column 52 and the saddle 55 and carries a horizontally extending bracket member 104 extending therefrom past the rear face of the column and saddle and at the side of the column 52 opposite the side carrying the saddle 55 and the distal end of the bracket bar 104 carries a forwardly extending plate 105 parallel to the axial line of the arbor and upon which motor 106 is mounted; said motor having a belt pulley 107 connected by a belt 108 with the belt pulley 98 on the arbor 76. Preferably, the belt is protected by a guard 109 which may be secured to the bracket bar 104 by any appropriate means.

The lower edge of the face of the saddle 55 on which the housing 75 is mounted is provided with an outwardly projecting boss or lug or boss 110 in which the lower end of a vertical jack screw 111 is threadedly engaged; said jack screw having a knurled head 112 adjacent its upper end by which it may be turned and terminating at its said upper end in a ball end 113 on which the housing 75 rests for support at any desired angle to the horizontal within the range of movement of said screw and as may be indicated by the dial 114 carried by the housing having reference to the associated pointer 115 carried by the bracket 69. As will be later explained, the wheel head assembly may be swung about its said pivotal mounting to vertical or other positions beyond the range of support by the jack screw, but in those positions, the said support is unnecessary.

Master Swivel Assembly

The master swivel assembly includes a vertically disposed shank portion 116 which is rectangular in cross section and is slidably mounted for vertical adjustment in a guideway formed in a bracket 117 comprising an integral portion of the machine frame 1, said bracket forming three sides of the guideway and the fourth side being closed by a cover plate 118 secured thereto by screws 119. A gasket 120 fixed to the upper end of the bracket 117 by a cover plate 121 and screws 122 closely surrounds the shank 116 to prevent the entrance of dust and grit into the interior of the guideway. The guideway means 117 is provided with a bottom plate 123 fixed thereto by screws 124 and mounted in the upper surface of this plate at substantially the axial center line of the guideway 117 is a vertical axis ball bearing 125 which supports the lower end of a vertical lead screw 126 extending upwardly in said axial line and engaging a nut 127 pressed into a receiving socket 128 in the master swivel shank 116; said shank beyond said nut having a smaller bore 129 extending in said axial line to afford clearance for the end of the screw when the shank is retracted into the guideway to the maximum extent. The leadscrew 126 adjacent the bearing 125 is provided with a bevel gear 130 which meshes with a second bevel gear 131 carried by the inner end of a stub shaft 132 which is journaled in the front side wall of the guideway 117 and carries an indicating dial 133. The outer end of the shaft is provided with a handle 134 for rotating the shaft 132 and consequently the leadscrew 126 for raising and lowering the shank 116 and the devices mounted thereon. Fixed to the inner front face of the guideway 117 by screws 135 is a gib plate 136 which is interposed between the inner wall of the front face of the guideway 117 and the adjacent face of the shank member 116. A clamp screw 137 threaded through the front wall of the guideway 117 and provided with an operating handle 138 affords means for moving the center portion of the gib plate 136 into tight engagement with the side of the master swivel shank 116 to clamp it in any vertically adjusted position achieved by the crank 134 and the leadscrew 126 actuated thereby.

The master swivel means per se comprises a stationary member in the form of a disc 139 having a flat lower face 140 which is interrupted at the center of the disc by a shallow cylindrical boss 141 which fits into a mating recess 142 in the upper end of the master swivel shank element 116. This stationary element 116. This shank element 116. This stationary element 139 includes on the upper face thereof an upwardly extending hollow shank portion 143 and a reduced diameter axially disposed bore 144 in said shank 143 affords clearance for a screw 145 to extend therethrough and threadedly engage the upper end of the shank member 116, the counter bore shoulder formed by the larger bore of the shank 143 and the bore 144 forming a seat for the head of the screw 145.

The upper end of the shank 116 is provided with diametrically opposite elongated recesses 146, 146 into which a pair of pins 147, 147 depending from the under face of the disc 139 extend. The opposite ends of the recesses 146 are entered by threaded bores containing set screws 148 which engage the opposite sides of the pins 147 and afford means for close circular adjustment of the disc 139 in the axial line of the shank 116. The peripheral face of the disc 139 carries a T-slot 149 which serves as a mounting means for certain stop elements presently to be described in detail.

Mounted for pivotal movement on the upper face of the disc 139 is the moving member 150 of the master swivel assembly comprising a shallow, inverted, circular, dish-like element having a radially extending arm portion 151 and having an axially disposed counter bore 152 in the upper face thereof in which the outer race of a radial thrust ball bearing 153 is mounted, the inner race thereof engaging the hollow cylindrical shank 143 of the stationary member 139. The inner face 154 of the member 150 carries a peripheral ring 155 which engages the outer diameter of the upper race of an axial thrust ball bearing 156 the upper side of which is engaged by the said under face 154 of the member 150. The lower race of said ball bearing rests on the upper surface of the stationary member 139 and the depth of the space in the member 150 housing the bearing 156 is such that the member 150 rides on the top surface of the disc 139 with minimum friction, the entire thrust load being assumed by the bearing 156. The cylindrical shank 143 in the member 139 extends through and above the upper face of the member 150 and is externally threaded. A spacing collar 157 surrounds said shank and bears against the inner race of the bearing 153. Surrounding the exterior surface of the spacing collar 157 is the inner diameter of a protractor dial 158 which is secured to the top surface of the member 150 and which along its outer edge is graduated in degrees. A washer 159 having a downturned outer edge surrounds the end of the shank 143 above the collar 157 and the said downturned edge closely clears the top surface of the protractor disc or dial 158. A nut 160 engages the threads on the shank 143 and serves to clamp the flange of the washer 159 down against the collar 157 and thus apply an initial load on the bearings 153 and 156. The counterbore 162 in the outer end of the shank 143 of the member 139 tightly receives the cylindrical shank 163 of a locator member 164 having an upwardly directed point 165 and said point is disposed exactly in the axial line of rotation of the member 150 on the member 139 and defines the vertical axial line relative to which the grinding wheel and the cutters supported in the work holding means to be described are located in adjusting or setting up the machine to grind a predetermined radius on a cutter. The stationary member 139 carries an upwardly and thence laterally extending finger 166 terminating adjacent the periphery of the plate 158 and carrying an index line with which the graduations on the plate 158 may register in moving the member 150 and the components carried thereby to a desired angular position about the axis upon which said member 150 moves.

The under face of the ring 155 is provided with an indexing means comprising a series of radial slots 167 spaced equally from each other, e.g., 15° from each other and the member 139 is provided with a spring pressed plunger 168 carried in a bushing member 169 having a threaded shank 170 engaging a hole extending through the member 139. The handknob 171 of the plunger also carries a pin 172 adapted to engage a hole 173 in the outer end of the bushing member 169 allowing the plunger to enter a selected one of the grooves 167. When, however, the plunger is pulled out of engagement with the groove and the handknob is rotated so that the pin 172 is out of registry with the hole 173, the plunger 168 is maintained in retracted position and the member 150 is then released to swing freely about its axis.

Mounted on the exterior of the disc member 139 are a pair of stop members 174, 174 secured thereon by screws 175 engaging nuts 176, 176 disposed in the groove 149. The bracket portion 151 which is formed as an integral part of the member 150 includes depending bosses 177, 177 each having a threaded hole extending therethrough in a direction tangent to a circle generated about the axis of the master swivel member and containing the stop faces 178, 178 of the stop members 174. Mounted in the threaded holes in the bosses 177, 177 are one each of a pair of thumb screws 179, 179 positioned to oppose the stop members. The use of these screws and the stop members depends upon the grinding operation being performed. In the event that the operation requires the locking of the member 150 at an angle not obtainable by the use of the spring plunger 168, that plunger is moved to inoperative position and the swivel member 150 is swung to the desired angle and locked in position by bringing the stop members 174, 174 into engagement with the respective screws 179, 179. If the first setting is not quite the exact angle desired backing off of one of the screws 179 and taking up the slack afforded on the other screw in the desired direction will produce the exact angle desired. Where the movement, as in grinding a radius is to be limited to a particular extent, the stop members are separated from the screws a sufficient distance so as to limit the arc of movement of the moving part of the master swivel to the desired angular extent.

Double Compound Support for Work Head

The upper face of the arm or bracket portion 151 of the member 150 is provided with a pair of ways 180 comprising downwardly converging faces on which a first saddle 181 is slidably mounted. The said first saddle 181 at its outer end is provided with a depending bracket 182 affording bearing support for the outer end of a leadscrew shaft 183 extending through said bearing and having a dial 184 and a handwheel or knob 185 exteriorly of said bearing. The opposite end of the leadscrew shaft 183 is threaded and engages a nut 186 carried by a stud 187 extending through the web of the bracket 151 and secured therein by a nut 188. Rotation of the shaft 183 in one direction or the other will cause the saddle 181 to move along the ways 180 in one direction or the other. The upper face of the member 181 is provided with a second parallel but slightly wider set of ways 189 on which a cross slide base 190 is mounted for sliding engagement parallel to the movement of the saddle 181, there being a gib 191 interposed in the ways 189 which is securable and releasable by a locking screw 192 at one side of the ways. Upon release of the locking screw 192, the cross slide base 190 can be manually shifted along the ways 189 and then locked in position. Thereafter, finer adjustment can be achieved through rotation of the leadscrew 183 by the handwheel 185 having reference to the indicating dial 184 and the graduations thereon.

The said first cross slide 190 on the upper face thereof is provided with downwardly converging ways 193 extending at right angles to the ways 180 and 189 and with a groove 194 parallel to and intermediate the ways 193. Slidingly engaging the ways 193 is a second saddle 195 having at its outermost end, a depending bearing member 196 affording bearing support for the outer end of a leadscrew 197 which externally of the bearing 196 carries a handwheel 198 provided with an indicator or graduated dial 199. The threaded portion of the leadscrew 197 engages a nut 200 fixed in the groove 194 by any appropriate means such as, for example, dowel pins 201. As the leadscrew 197 is rotated in one direction or the other, the saddle 195 will be positively moved along the ways 193. The upper face of the saddle 195 is provided with a pair of downwardly diverging ways 202 which are parallel to the ways 193 and are engaged by a freely slidable work head supporting table 203, a gib 204 being interposed between the bearing surfaces at one side of the ways and said gib being tightened and released by a locking screw 205. This free sliding mounting and locking means permits quick movement of the table 203 along the ways 202 of the saddle 195 to an approximate desired position after which the finer adjustment may be made by the leadscrew 197. The upper face of the table 203 is horizontal and is provided with a longitudinally extending slot 206 having vertically extending studs 207 and 208 projecting therefrom, for reception of the tool holding means now to be described.

*Work Head and Mounting Hereof*

In general, the work head 8 is like the corresponding work head described and claimed in my prior patent, No. 2,958,988, granted November 8, 1960; said work head including a circumferentially adjustable indexing ring adapted to serve for a plurality of different radial spacings to accommodate cutters having different numbers of teeth and also in the fact that said work head is adapted to be secured to the supporting means on the machine by a single bolt means beneath the tool supporting or engaging means thereof. Means is provided, however, in the present invention for facilitating the use of the work head and in setting up the machine and work head for different tool grinding operations.

The base 209 of the work head 8 is provided with vertical ribs 210, 210 which support the housing 211 containing the tool engaging means leaving a space bounded by said ribs, said base and said housing for reception of a nut 212 engageable with the one of the studs 207 or 208 upon which the work head may be positioned, the engagement between the stud and the hole in the base 209 through which it projects being sufficiently close to prevent lateral play while allowing the head to be rotated about the stud to a desired position. It will be understood that the axis of the stud receiving hole in the base 209 intersects the axis of the tool engaging means in the housing 211 so that rotation of the head upon the stud on which it is mounted will not effect lateral shifting of the axis of the tool holding means in the housing 211 relative to the axial line of the stud about which the work head is rotated.

The table 203 along one edge thereof has an upstanding lug 213 containing a setscrew 214 securable by a lock nut 215. The work head base 209 adjacent its rear end and at the side thereof adjacent the lug 213 is provided with a hardened pad 216 and with a setscrew 217 at its forward end at the same side. Referring to FIG. 20, when the pad 216 is brought into engagement with the setscrew 214, with the setscrew suitably adjusted, the axis of the work head is disposed parallel to the slot 206 and parallel to the means for adjusting the work head parallel to the direction of travel of the slide 26. In this position the work head is positioned for grinding the teeth of a cutter which extend parallel to the axis of the cutter or as will be later described for grinding a radius on the teeth of a cutter that is tangent to teeth which are parallel to the cutter axis. If the teeth to be ground are at an angle to the axis of the cutter, the movement about the axis of the master swivel is employed. For certain operations it is desirable to position the work head at right angles to the position above described. In that case, the nut 212 is loosened and the work head is swung about the stud 207 to a right angle position until the setscrew 217 engages the side of the lug 213 as indicated in dotted lines in FIG. 20, the setscrew 217 being adjusted to produce only the exact right angle position, or such slight deviation as may be required to produce a concavity on the end or side of a particular cutter being held in the work head.

In the case of very long cutters or reamers, it may be desirable to move the work head back to provide additional room. For such use, the work head is removed from the stud 207 and is placed on the stud 208 as shown in FIG. 21. The table 203 is provided with a second lug 218 having a set screw 219 locked by a lock nut 220 which is adapted to engage the pad 216 on the work head base as shown in FIG. 21.

*Slide Traversing Means*

As previously mentioned, the slide 26 which carries the wheel head column is selectively caused to traverse or reciprocate by a manual means or by a power means. In grinding the straight teeth of cutters, the present machine differs from that of my said prior patent in that the grinding wheel is caused to traverse the cutter instead of the cutter being moved past the grinding wheel.

The motor 39 is controlled by a master switch 221 and an interposed reversing switch 22. When the reversing switch is in the position shown in full lines in FIG. 1, the motor is inoperative. Moving the handle of the reversing switch to the left as viewed in FIG. causes the motor to drive the leadscrew 42 in a direction causing the slide 26 to move to the left, assuming that the split nut 43 is in engagement with the leadscrew. Moving the reversing switch handle to right as viewed in FIG. 1 will operate the motor and leadscrew in the opposite direction and assuming that the split nut 43 is in engagement with the leadscrew, the slide 26 will move to the right.

The half nut 43 is mounted for vertical sliding movement in a guideway 44 formed in a boss 223 on the side of a plate 224 secured by screws 225 to the side of the slide supporting member 25 which is adjacent the end of the slide 26 carrying the leadscrew operating motor 39. A plate 226 overlies the guideway 44 and is secured to the plate 224 by screws 227. A feed engaging lever 228 is pivoted to the plate 224 at 229 and extends below the lower end of the half nut 43 which is loosely secured by a screw 230 to said lever 227 thence extending forwardly beyond the front edge of the member 25 and terminating in a handle 231 and said handle means being provided with a screw 232 engageable, in a manner to be described, with a stop lug 233 projecting from and forming a portion of a latching member 234.

A latching member 234 is pivotally mounted on a screw 235 at the forward outer face of the plate 224 said latching member having a handle means provided with a double taper cam face 237 which is V-shaped as viewed in plan and the lever is normally biased to tend to move in a clockwise direction as viewed in FIG. 10 by a compression spring 238 reacting between the side of the shoulder 239 formed by the forward face of the guideway means 237 and a parallel face on said member 234.

The slide 26 is provided with a T-slot 242 which extends the full length of the front face thereof and in which a pair of stops 243, 243 are secured by screws 244 in adjusted positions, each of said stops having a taper face 245 engageable with the taper face 237 on the latch release lever 234 to move it counter clockwise as viewed in FIG. 10, disengaging the dogs 240 and 241 with resultant disengagement of the half nut 43 from the leadscrew and stopping of the table at the position at which this interengagement between the stop and the lever occurs. Since the stop member is in engagement with the lever, the latching lever 228 cannot be moved up into latching position and therefore the reverse movement of the table from the direction in which it is driven must be achieved manually by first bringing the gear 28 into engagement with the rack 36 and then by operation of a shaft 33 by the handle 33' attached thereto moving the slide in the opposite direction to the desired extent and then reengaging the latch and moving the handle of the reversing switch in the direction to cause power feed of the slide in the direction opposite that by which it was thus moved manually. When it is desired to hold the slide 26 in a stationary position, it is moved either manually or by the leadscrew to the desired position and locked against movement by tightening the setscrew 31'. When the above described power feed is employed, the screw 232 is positioned about as illustrated in FIG. 10. When, however, it is desired to retain full manual control of the power feed, the screw is moved upwardly to an extent that upon upward movement of the then unlatched lever 231 toward latching position, it will engage the stop lug 233 before the dog 240 has moved upwardly sufficiently to allow the dog 241 to move under it into latching position as illustrated. In other words, the dogs 240 and 241 will merely assume end to end relation and power feed will exist only so long as the lever 231 is held up manually.

*Grinding a Radius*

Referring next to FIGS. 16, 17 and 18 the mode of setting up the machine and adjusting it to grind a required radius on the end of a cutter is illustrated. For this purpose, after a cutter C has been suitably mounted in the work head 8, the work head 8 is moved rearwardly in the direction of the axis of the work head until the end face of the cutter is slightly back of the edge of the saddle 181 as is best illustrated in FIGS. 17 and 18. This end face of the saddle 181 is provided with spaced horizontal pins 242 and 243 and with a vertically extending T-slot 244 disposed between said pins. The saddle 181 is mounted at a fixed distance from the center line of the master swivel by reason of the ways 180. Accordingly, the pins 242 and 243 are also disposed at predetermined distances from vertical planes extending axially of said pins and another plane parallel to said axial planes of said pins intersecting the center line of the master swivel.

A removable gage element 245 includes an arm 246 having a hole 247 for reception of the pin 242, a slot 248 for the reception of the pin 243, and a hole through which a bolt 249 extends for engagement of the head 250 thereof in the T-slot 244, the arm 246 thence extends upwardly at about a 45° angle and carries a vertically extending locating member 251 at the outer edge thereof, said member having a face 252 disposed normal to the axis of the work head, another vertical face 253 at right angles to the face 252 and a flat top surface 254 which is at right angles to both of the faces 252 and 253 and which lies in a horizontal plane containing the axial line of the tool head 8.

After the gage 245 is applied to the end of the slide 181 by tightening the nut on the bolt 249, the slide 181 is moved to the right as viewed in FIG. 5 by the hand wheel 185 and leadscrew 183 until the end surface of the slide 181 is flush with the side surface of a gage block 255 fixed to the side surface of the arm 151 of the swivel member 150 as thus shown in FIG. 16. When the member 181 is thus positioned, the face 252 of the gage block 251 lies in a vertical plane intersecting the vertical axial line of the master swivel. Thus, the corner formed by the juncture of the faces 252 and 253 is coincident with the axial line of the master swivel while the top surface 254 lies in the horizontal plane intersecting the axis of the work head as indicated in FIG. 16 wherefore, the corners formed by the juncture of the top surface 254 with the corner formed by the faces 252 and 253 defines the point of the intersection of the vertical axial line of movement of the master swivel with a horizontal plane containing the axis of rotation of the tool holding means and of a tool held thereby.

Assuming that a cutter C has been secured in the work head, the work head is then adjusted laterally of its axis until the side of the cutter is coincident with the plane of the face 253 of the gage block 151. Preferably, at this time, the end of the cutter is spaced slightly away from the face 252. Since the slide 181 must be maintained in the position to which it has been moved to bring the side 252 of the block 251 into coincidence with the axial line of the master swivel, it cannot be disturbed. Accordingly then, the locking screw 192 is released and the first cross slide base 190 is shifted along the cross slide 180 until the end face of the cutter barely touches the face 252 of the gage block 251. The cutter and the gage block are then in the position shown in FIG. 17 in which vertical planes containing the side of the cutter and the end face thereof intersect at the axial line of the master swivel. This constitutes a primary or basic setting of the machine to which it may be re-adjusted at the completion of each step in the complete operation of grinding a cutter mounted in the work head, i.e., grinding the peripheral teeth, grinding the end or side face teeth, and, if required, grinding a radius at the juncture of a peripheral tooth and a tooth at an angle thereto, so that adjustments for successive steps in the operation proceed from an established common point. Upon establishment of this basic setting for the cutter to be ground, the gage 245 is moved out of the way by being removed or swung out of the way about the pin 242 until it is required for another adjustment.

Since the top face 254 of the block 251 is in the horizontal plane of the axis of the work head, the cutter can be rotatably adjusted and secured in the work head so that the forward end of the tooth at which the grinding is to start is brought into the plane of this top surface or in a horizontal plane slightly above the horizontal plane of the face 254 dependent upon whether the grinding is to be done by the peripheral surface of a disc type wheel or by the end face of a cup type wheel. Thereafter, as each successive tooth is indexed by the work head, each tooth will be in the correct position for grinding.

After these steps have been completed, if a radius is to be formed on the teeth, the hand wheels 185 and 198 are employed to adjust the work head the required radial distance parallel to the side of the cutter and parallel to the end of the cutter thus positioning the corner of the cutter in the proper position relative to the axial line of the master swivel to grind the desired radius. The grinding wheel is then moved into position so that the face thereof is in contact with the tooth to the desired extent and then, by swinging the work head and its supporting means about the axis of the master swivel within limits determined by the setting of the stops 174 of the master swivel, the radius grinding of the end of the cutter is performed. If the radius is to be formed with some desired angular clearance, the wheel head is given the desired angularity by adjustment of the supporting jack screw 111. Thus, with what amounts to a single set-up, an end face of a cutter, the side face of the cutter and any radius at the juncture of the end and side faces of the cutter teeth can be ground. Preferably, after each griding operation on a cutter held in the work head, the work head supporting means is adjusted to bring the axial line of the cutter into registry with the vertical axial line of the master swivel assembly to provide a starting point for the adjustment of the machine for the next step in the grinding, e.g., grinding the end teeth after having ground the side teeth or grinding a radius.

The side of the cross slide 190 adjacent the end of the saddle 181 on which the gage 245 is maintainable carries of vertical index line 190' so located that it is not covered by the gage and the adjacent side of the saddle 195 carries a similar index line 195'. These lines are so located that when brought into registry, a vertical plane containing the axis of the barrel of the tool holder 8, when positioned parallel to the path of movement of the slide 26, is coincident with the axial line of the master swivel and by this simple setting, the machine is adjusted to grind a ball end milling cutter upon completing the dimensional adjustment for the radius to be thus ground.

*Other Grinding Operations*

If the side teeth of a cutter are to be ground, the gage 245 can be installed so that the edge of the tooth to be ground can be correctly located with respect to the top surface 254 as already explained in connection with discussing the grinding of a radius. If it is a straight tooth, a guiding finger is unnecessary. If, however, it is a spiral tooth cutter as shown for example, at C' in FIG. 14, a tooth engaging and positioning finger 256 can be attached to the wheel guard 95 by a screw 256' extending through an elongated opening in the finger and thus, as the grinding wheel traverses the edge of the tooth, the tooth can be maintained in contact with the top edge of the finger so that at the point of grinding it is always in the proper plane containing the axis of the work head. The screw 94 and slotted arm 93 afford adjustment to compensate for wear on the face of the grinding wheel.

On reference to FIG. 15, the finger 256 is indicated as engaging a tooth of a small cutter C' and the grinding wheel is shown as positioned at an angle in full lines for the primary clearance on the cutter tooth and the second position in dotted lines for the secondary clearance.

Referring next to FIG. 23, there is shown the use of the straight grinding wheel on the opposite end of the wheel head spindle 76. To bring this end of the spindle into position relative to the work head the wheel supporting column 52 has been rotated counterclockwise as viewed in FIG. 2 to 90° from the position shown in that figure thus bringing the arbor parallel to the path of travel of the slide 26. The slide 26 is reciprocated either manually or manually and by power as heretofore explained and the cutter is positioned in the work head by any appropriate means, the use of the gage 245 being a quick and convenient means of so doing. If the cutter happens to be a spiral tooth cutter, a finger 257 supported on a horizontal rod 258 extending parallel to the axis of the spindle and secured for axial and radial adjustment in a bracket 258' secured by a screw 259 to a seat 259' on the guard 102 with provision for adjustment in a line normal to the spindle axis to compensate for wear on the periphery of the wheel, may be employed. If desired, the bracket may be alternatively mounted in a diametrically opposite seat 259''. Fine adjustment of the end of the finger 257 may be achieved by the opposed screws 260, 260 which engage opposite sides of a lug 260' projecting from the outboard bearing into a socket in the face of the guard 102. Since the grinding is done by the periphery of the wheel, the necessary primary and secondary clearance will depend upon the distance that a horizontal plane containing the axis of the spindle is below a horizontal plane containing the axis of the cutter. The greater the space there is between these two horizontal planes the greater the clearance ground on the tooth will be.

Referring next to FIG. 25 there is shown a portion of the tool head including a dual purpose cutter supporting adapter 261 which is drawn into and seated in a sleeve 262 by a draw sleeve 263. The outer diameter of this adapter is that of the arbor receiving bore of some standard size of milling cutters and the central bore thereof is the size of a standard shank of an end mill or other shank type cutter which may be inserted therein and be secured by a setscrew engaging the radial threaded hole 264 thereof. A draw rod 265 operated by a hand nut 266 will serve to secure the milling cutter C on the adapter unless the grinding operation requires that the milling cutter be left free thereon and the grinding of the tool be treated as a "dead spud" grinding operation. In the latter case the draw rod will be tightened only enough to prevent endwise movement of the cutter without binding it to an extent at which it cannot rotate on the adapter.

The foregoing description of certain grinding operations describes the majority of the operations that may be performed on the machine. However, for many special operations the machine may be otherwise adjusted as for example, in FIG. 26, a shallow dishwheel has been substituted for the cup wheel and the spindle 76 and its driving motor has been tilted into approximately vertical position about the opposed cone elements which form the pivotal mounting therefor. In this position, the wheel illustrated may be employed for such operations as grinding the flutes on a cutter of some type or of recutting the front faces of such flutes in the operation generally known as "gumming."

FIG. 29 shows the use of an angle plate 267 having the horizontal member 268 thereof provided with a hole for the reception of either of the studs 207 or 208 and further having key means 269 on the under face thereof engageable with the slot 206 in the work table. A nut 270 engages the work table stud on which the angle plate is mounted to secure the angle plate thereon. The vertical member 271 of this angle plate carries a laterally extending stud 272 on the outer face thereof adapted for close fitting engagement with the hole in the work head base 209 and the work head is secured thereon by the nut 212. By this means, the work head 8 may be adjusted about a horizontal axis to desired angles relative to a horizontal plane for operations such as grinding the flutes on a tap or grinding the teeth of a hollow mill.

It is particularly to be noted that the mounting of the wheel on the slide 26 through the rotational adjustment of the wheel supporting column about a vertical axis and the rotational adjustment of the spindle about a horizontal axis on the column together with the fact that the spindle presents the capability of using either one of two different wheels mounted on opposite ends of the spindle for different operations gives the machine a wide range or utility in the selection of grinding wheel position with respect to the work to be performed and that the protractor or dial elements of the vertical wheel supporting column and of the spindle tilting movement enable the setting of this spindle and the face of the grinding wheel to be used to a definite position. Additionally, the close control over the vertical position of the spindle on the supporting column adds still another dimension to the capability of positioning the grinding wheel for a desired tool grinding operation.

Next considering the work support, there has been provided a work supporting means mounted for movement relative to and rotatably about a fixed vertical axial line whereby through the various adjusting means for the tool holding devices a tool may be accurately positioned both for grinding of a radius at the juncture of two tooth faces and for the grinding of the teeth themselves both at the end of the cutter and at the side thereof.

While in the foregoing specification there has been described a presently preferred embodiment of the invention, the invention is not to be deemed to be limited to the precise details of construction thus disclosed by way of example, and it will be understood that the invention includes as well all such changes and modifications in the parts and in the construction, combination and arrangement of parts as shall come within the purview of the appended claims.

I claim:

1. In a machine for grinding the teeth of tools such as milling cutters, ball end mills and end mills, a base, means for mounting a wheel head unit on said base; said unit including a rotatable spindle having means for mounting a grinding wheel on each end thereof and power means for driving said spindle; said mounting means for said wheel head unit including separate devices for moving said unit on said base in transversely extending horizontal directions, in a vertical line, about a vertical axis, and about a horizontal axis transverse to the spindle axis, a work holding means for holding a cutter to be ground by the selected one of said grinding wheels positioned by appropriate adjustment of said mounting means to grind the tooth of a tool so held carried by said base and devices carried by said base and supporting said work holding means; said devices including an element pivotally movable about a vertical axial line having a fixed relation to said base, a first horizontally linearly adjustable means carried by said element, and a second horizontally linearly adjustable means carried by said first horizontally adjustable means and having a work table surface on which said work holding means is carried; said second named adjustable means being linearly adjustable in a line normal to the line in which said first named horizontally adjustable means is adjustable.

2. A tool grinding machine as claimed in claim 1 in which each of said horizontally linearly adjustable means includes a screw thread operated adjustment means and a freely slidable adjustment means operable independently of the screw thread operated means and in a line of movement parallel to the line of movement of said screw thread operated means.

3. A tool grinding machine as claimed in claim 1 in which said spindle is journaled in a housing means and protrudes from the opposite ends of said housing means, in which the said housing means at least one end thereof is provided with an annular surface coaxially disposed with respect to the axial line of said spindle, and on which annular surface a combined wheel guard and cutter tooth positioning finger assembly is mounted for adjustment thereon; said assembly including screw threaded devices manually operable to determine the rotative position of said one of said assemblies on said annular surface, and other devices operable to secure said one assembly in a desired position parallel to the axial line of said annular surface while preserving the rotative position determined by said screw threaded means.

4. A grinding machine as claimed in claim 1 in which said spindle carries a cup wheel on one end thereof and a straight grinding wheel on the other end thereof, in which said wheel head unit further includes separate, combined wheel guard and cutter tooth positioning finger assemblies associated one each with each of said wheels and in which at least one of said assemblies includes screw threaded means operable to determine the rotative position of said one assembly.

5. A tool grinding machine as claimed in claim 1 in which said base carries a column adjustable in transverse directions in a horizontal plane and on which column said wheel head unit is mounted for vertical adjustment and for adjustment about a horizontal axis transverse to the spindle axis, in which said power means comprises an electric motor and in which said wheel head unit includes separate supporting means for said spindle at one side of said column and for said motor at the opposite side of said column, means connecting said spindle supporting means and said motor supporting means to form a rigid U-shaped bracket surrounding three sides of said column and adapted to extend above the upper end of said column when said wheel head unit is swung about said horizontal axis to a position in which the spindle is disposed in a vertical position and means for securing said wheel head unit in any position to which it may be moved about said horizontal axis.

6. A tool grinding machine as claimed in claim 1 in which each of said linearly adjusting devices includes a first means adjustable by leadscrew operated devices and a second means which, when released, is freely slidable on said first means in a direction parallel to the movement effected by said lead screw operated devices and which, further, includes a manually operable clamping and releasing means interposed between the relatively sliding members of said second means.

7. A tool grinding machine as claimed in claim 1 in which said base includes a bracket on which said supporting means for said work holding means is mounted by means including pivot means upon which said supporting means and said work head are movable as a unit about a vertical axial line having a fixed relation to said base and on which bracket said supporting means is vertically adjustable.

8. A tool grinding machine as claimed in claim 7 including devices for indexing movement about the axis of said pivot means in predetermined increments of arc.

9. A tool grinding machine as claimed in claim 7 in which said pivot means includes adjustable stop means operable optionally to lock said pivot means against pivotal movement of said work head and supporting means therefor.

10. A tool grinding machine as claimed in claim 7 in which siad pivot means includes devices for indexing said pivotal movement of said work head and said supporting means about said vertical axial line in predetermined increments of arc and, further, includes other devices for adjusting the non-rotating portion of said pivot means about the axial line thereof to bring said indexing means into a predetermined angular relationship with said base.

11. In a machine for grinding the teeth of tools such as milling cutters, ball end mills and end mills, a base, a wheel head unit mounted on said base, a work head and supporting means therefor mounted on said base, means for effecting relative movement between the grinding face of a grinding wheel on said wheelhead unit and the tooth of a tool being ground and carried by said work head in a path coincident with the line of said tooth, said work head having a cutter mounting means comprising a hollow, cylindrical, cutter engaging element, the outer peripheral surface of said element being of a size to receive and support a cutter having a corresponding mounting hole therein and the inner periphery of said element constituting a coaxially disposed hole of a diameter to receive the shank of a shank type milling cutter therein, means for securing a cutter on said outer peripheral surface, and other means for securing the shank of a cutter in said hole.

12. In a machine for grinding the teeth of tools such as milling cutters, ball end mills and end mills from an initial basic setting of a cutter to be ground in the machine, a base, a wheel head unit including driving means therefor mounted on said base, a work head for holding a cutter to be ground and supporting means therefor mounted on said base; said work head having means effective to position and rotate a tool mounted therein about a horizontal axis, means for effecting relative movement between the grinding face of a grinding wheel on said wheel head and the tooth of a tool held by said work head in a path coincident with the line of said tooth, means for moving said work head and said supporting means therefor about a vertical axial line having a fixed relation to said base, and a cutter locating gage means removably positionable in a predetermined location on said work head supporting means effective, when so positioned on said supporting means, to indicate the point of intersection of said vertical axial line with a horizontal plane containing the axis of a tool carried by said work head.

13. A tool grinding machine as claimed in claim 12 in which one surface of said supporting means includes means cooperating with another surface of said supporting means effective to locate a surface of said gage means in a plane intersecting said vertical axial line and extending normal to the axis of a cutter mounted in said work head.

14. A tool grinding machine as claimed in claim 12 in which adjacent and relatively moving components of said supporting means for said work head each carry indicia means which, when juxtaposed, locate the axial line of a cutter mounted in said work head coincident with a vertical plane containing said vertical axial line.

15. In a machine for grinding the teeth of tools such as milling cutters, ball end mills and end mills from an initial basic setting of a cutter to be ground in the machine, a base having a pair of horizontal ways, a saddle mounted on said ways and including means for positively moving said saddle along said ways to predetermined extents, a pair of horizontal ways carried by said saddle and extending at right angles to said first-named ways, a slide mounted for reciprocable movement on said ways on said saddle, manually operated devices for moving said slide along said last-named ways, a vertical column mounted on said slide with provision for axial adjustment thereon about a vertical axis, a wheel head unit comprising a grinding wheel and supporting spindle and driving means therefor mounted on said column for bodily vertical adjustment and for axial adjustment about a horizontal axis, and a work supporting means carried by said base comprising a work head for holding a cutter to be ground and supporting means for said work head including adjustable means operable to establish a basic setting with respect to a vertical axial line having a fixed relation to said base of a cutter to be ground held by said work head and further including means for permitting movement of said supporting means and said workhead as a unit about said vertical axial line.

16. In a machine for grinding the teeth of tools such as milling cutters, ball end mills and end mills, a base having a pair of horizontal ways, a saddle mounted on said ways and including means for positively moving said saddle along said ways to predetermined extents, a pair of horizontal ways carried by said saddle and extending at right angles to first-named ways, a slide mounted for reciprocable movement on said ways on said saddle, separate, optionally usable, manually operable means and power operated means for moving said slide in reverse directions along said last-named ways, a vertical column mounted on said slide with provision for axial adjustment thereon about a vertical axis, a pair of vertically extending ways on said column, a saddle vertically movable along said ways on said column, manually operable means for raising and lowering said vertically movable saddle to predetermined extents along said ways on said column, a wheel head unit, a grinding wheel and supporting and driving means therefor mounted on said vertically movable saddle for movement as a unit about a horizontal axis, and a tool supporting means carried by said base comprising a work head adapted to hold a tool to be ground by said grinding wheel and supporting means for said work head and including means for permitting movement of said supporting means and work head about a vertical axial line having a fixed relation to said base incident to grinding a radius on the tool so held.

17. In a machine for grinding the teeth of tools such as milling cutters, ball end mills and end mills, a base having a pair of horizontal ways, a saddle mounted on said ways and including means for positively moving said saddle along said ways to predetermined extents, a pair of horizontal ways carried by said saddle and extending at right angles to said first-named ways, a slide mounted for reciprocable movement on said ways on said saddle, means for separate, optionally usable, manually operable means and power operated means for moving said slide in reverse directions along said last-named ways, a vertical column mounted on said slide with provision for axial adjustment thereon about a vertical axis, a pair of vertically extending ways on said column, a saddle vertically movable on said ways along said column, manually operable means for raising or lowering said vertically movable saddle to selected extents on said ways on said column, a grinding wheel means comprising a spindle supporting means, a spindle journaled in said spindle supporting means, power means fixedly mounted with respect to said spindle supporting means, and operatively connected to said spindle adjacent one end of said spindle supporting means, a grinding wheel supporting collet on said spindle at the other end of said spindle supporting means, means for mounting said spindle supporting means on said vertically movable saddle for pivotal movement about a horizontal axis transverse to the axis of said spindle and disposed adjacent to said last-named end of said spindle supporting means, means for securing said spindle supporting means to said vertically movable saddle in any position to which it may be adjustably moved about said horizontal axis, and a tool supporting means carried by said base comprising a work head adapted to hold a tool to be ground by said grinding wheel and supporting means for said work head and including means for permitting movement of said supporting means and said work head as a unit about a vertical axial line having a fixed relation to said base incident to grinding a radius on the held tool.

18. In a machine for grinding the teeth of tools such as milling cutters, ball end mills and end mills from an initial basic setting of a cutter to be ground in the machine, a base having a pair of horizontal ways, a saddle mounted on said ways and including means for positively moving said saddle along said ways to predetermined extents, a pair of horizontal ways carried by said saddle and extending at right angles to said first-named ways, a slide mounted for reciprocable movement on said ways on said saddle, a manually operable, manually engageable and disengageable means for effecting movement of said slide along said last-named ways, a manually controlled power means optionally operable for effecting movement of said slide along said ways and including adjustable stop means effective to disable said power means at selected limits of travel of said slide, a vertical column mounted on said slide with provision for axial adjustment about a vertical axis, a pair of vertically extending ways on said column, a saddle movable on said vertically extending ways, manually operable means for raising and lowering said saddle to selected extents on said vertically extending ways, a wheel head unit comprising a grinding wheel, a supporting spindle and driving means therefor mounted on said saddle for movement about a horizontal axis transverse to and intersecting the axis of rotation of said grinding wheel, and a tool supporting means carried by said base comprising a work head for holding a cutter to be ground and supporting means for said work head and including means for permitting movement of said supporting means and said work head as a unit about a vertical axial line having a fixed relation to said base.

19. A tool grinding machine as claimed in claim 18 in which engagement of said stop means with said lever disengages said power means from said slide until initial reverse travel of said slide has been effected by said manually operated means therefor.

20. In a machine for grinding the teeth of tools such as milling cutters, ball end mills and end mills from an initial basic setting of a cutter to be ground in the machine, a base having a pair of horizontal ways, a saddle mounted on said ways and including means for positively moving said saddle along said ways to predetermined extents, a pair of horizontal ways carried by said saddle and extending at right angles to said first-named ways, a slide mounted for reciprocable movement on said ways on said saddle, a manually operable, manually engageable and disengageable means for moving said slide along said last-named ways, a manually controlled power means optionally operable for moving said slide along said ways including adjustable stop means effective to disable said power means at selected limits of travel of said slide, a vertical column mounted on said slide with provision for axial adjustment thereon about a vertical axis, a pair of vertically extending ways on said column, a saddle movable on said vertically extending ways, manually operable means for raising and lowering said saddle to selected extents on said vertically extending ways, a grinding wheel means mounted on said vertically movable saddle comprising a spindle supporting means, a spindle journaled in said spindle supporting means, power means fixedly mounted with respect to said spindle supporting means and operatively connected to said spindle adjacent one end of said spindle supporting means, a grinding wheel supporting collet on said spindle at the other end of said spindle supporting means, means for mounting said grinding wheel means on said vertically movable saddle for pivotal movement about a horizontal axis transverse to and intersecting the axis of said spindle and disposed adjacent to said last-named end of said spindle supporting means, means for securing said spindle supporting means to said vertically movable saddle in any position to which it may be adjustably moved about said horizontal axis, and a tool supporting means carried by said base comprising a work head for holding a cutter to be ground and supporting means for said work head.

21. A tool grinding machine as claimed in claim 20 in which said power means for effecting traverse of said slide includes stop means carried by said slide and operative to render said power means incapable of effecting reverse travel of said slide until initial manually operated reverse travel of said slide has been effected by said manually operable means therefor.

22. In a machine for grinding the teeth of tools such as milling cutters, ball end mills and end mills from an initial basic setting of a cutter to be ground in the machine, a base having a pair of horizontal ways, a saddle mounted on said ways and including means for positively moving said saddle along said ways to predetermined extents, a pair of horizontal ways carried by said saddle and extending at right angles to said first-named ways, a slide mounted for reciprocable movement on said last-named ways, means for effecting movement of said slide in reverse directions along said last-named ways, a vertical column mounted on said slide with provision for axial adjustment thereon about a vertical axis, a wheel head unit comprising a grinding wheel and supporting and driving means therefor mounted on said column, and a tool supporting means carried by said frame comprising a work head for holding a cutter to be ground and support means therefor and including means for permitting movement of said support means and said work head about an axis coincident with a vertical line having a fixed relation to said base; said support means including separate devices adjustable in separate horizontal planes in traverse directions for moving said work head and a cutter held therein in said horizontal plane with relation to said vertical axial line whereby a tooth of the cutter may be ground in a predetermined manner; said separate devices for adjusting said work head relative to said vertical axial line each including a first means adjustable by leadscrew operated devices and a second means manually slidable and including manually operable releasing and clamping devices for said clamping means.

23. A tool grinding machine as claimed in claim 22 in which said separate devices for adjusting said work head relative to said vertical axial line each includes a first means adjustable by leadscrew operated devices and a second means manually slidable and including manually operated releasing and clamping means for said slidable means.

24. A tool grinding machine as claimed in claim 22 in which said means permitting movement of said tool supporting means and said work head about said axial line includes a bracket fixedly mounted on said base and having a guideway, a member vertically slidable in said guideway on which said tool supporting means is mounted and means carried by said base and engaging said member in said guideway operable to effect vertical adjustment of said member and said tool head supporting means relative to said base.

25. In a machine for grinding the teeth of tools such as milling cutters, ball end mills and end mills from an initial basic setting of a cutter to be ground in the machine, a base, means for mounting a wheel head unit on said base; said unit including a grinding wheel mounted on a spindle and power means for driving said spindle, said mounting means including separate devices for moving said unit on said base in tranverse directions in horizontal planes, in a vertical line, and about a horizontal axis and a vertical axis, a work head attaching means, a work head for holding a cutter to be ground, and supporting means for said work head attaching means carried by said base including adjustable means operable to establish a basic setting with respect to a vertical axial line having a fixed relation to said base of a cutter to be ground held by said work head permitting pivotal movement of said supporting means, said work head attaching means and said work head as a unit about said vertical axial line.

26. A tool grinding machine as claimed in claim 25 in which said wheel head unit includes a combined wheel guard, a cutter tooth positioning finger assembly adjustable as a unit circularly about the axial line of said spindle, and screw threaded means operable to determine the rotative position of said assembly.

27. A tool grinding machine as claimed in claim 25 in which said supporting means for said work head is mounted for vertical adjustment on said base.

28. A tool grinding machine as claimed in claim 25 in which said work head supporting means includes a work table having a vertical stud upon which said work head is secured and in which said work table is provided with stop means engageable with said work head effective to predetermine the position of the work head about said vertical stud.

29. A tool grinding machine as claimed in claim 25 in which said work head supporting means includes a work table upon which said work head is secured; said work table having a horizontal surface provided with two vertically disposed studs projecting upwardly therefrom upon either of which said work head may be optionally secured; said work table further having stop means engageable of said work head to predetermine the position of said work head upon said work table when secured thereon by either of said studs.

30. A tool grinding machine as claimed in claim 25 in which said work head supporting means includes a work table having a horizontal work head receiving surface on which said work head is mounted; said surface being provided with a slot extending from side to side thereof and from which slot a vertically disposed stud projects for securing said work head thereon; said work head including a portion having engagement with said slot to prevent rotative movement thereof on said work table.

31. A tool grinding machine as claimed in claim 25 in which said supporting means includes vertically separated devices disposed in separate horizontal planes and independently operable for shifting said work head attaching means and a work head attached thereto; one of said last-named devices being operable in one of said horizontal planes to shift said work head attaching means and said work head along a horizontal line in one direction and the other of said devices disposed in another horizontal plane being operable to shift said one of said last-named devices, said work head attaching means and work head, as a unit, in a horizontal direction normal to the direction of shifting said work head and said work head attaching means permitted by said first-named devices.

32. A tool grinding machine as claimed in claim 25 in which said work head is mounted on said attaching means and is provided with cutter holding means rotatable about a horizontal axis, and in which said supporting means includes a gage element removably positionable on a portion of said supporting means in a fixed relation to said vertical axial line and said gage element having a block forming a part thereof presenting a first vertical surface lying in a vertical plane intersecting said axial line of pivotal movement of said supporting means, a second vertical surface at right angles to said first surface and combining with said first surface to form a corner which is coincident with said axial line, and a horizontal surface forming corners with each of said two vertical surfaces and disposed in a horizontal plane containing the axis of said rotatable cutter holding means of said work head; all of said corners combining to define a point representing the intersection of said vertical axial line with said horizontal plane containing the axis of said cutter holding means.

33. In a machine for grinding the teeth of tools such as milling cutters, ball end mills and end mills from an initial basic setting of a cutter to be ground in the machine, a base having a pair of horizontal ways, a saddle mounted on said ways and including means for positively moving said saddle along said ways to predetermined extents, a pair of horizontal ways carried by said saddle and extending at right angles to said first-named ways, a slide mounted for reciprocable movement on said ways on said saddle, means for effecting reciprocable movement of said slide along said last-named ways, a vertical column mounted on said slide with provision for axial adjustment thereon about a vertical axis, a wheel head unit comprising a grinding wheel and supporting and driving means therefor mounted on said column for bodily vertical adjustment and for axial adjustment about a horizontal axis transverse to the axis of said grinding wheel, a work supporting means carried by said base comprising a work head adapted to secure a cutter to be ground and supporting means for said work head and including adjustable means operable to establish a basic setting with respect to a vertical axial line having a fixed relation to said base and further including means for permitting movement of said supporting means about said vertical axial line, and releasable indexing devices for limiting said pivotal movement of said work head suporting means to predetermined increments of arc, other means for disabling said releasable devices, and separate means optionally operable to stop said pivotal movement permitting means at points not determined by said indexing means.

34. In a tool grinding machine for grinding the teeth of tools such as milling cutters, ball end mills and end mills from an initial basic setting of a cutter to be ground in the machine, a base, a work head adapted to hold a cutter to be ground, supporting means for said work head mounted on said base for adjustment vertically and in horizontal lines normal to each other, a spindle carrying a grinding wheel and supporting and driving means for said spindle, means for effecting relative movement between said work head, said grinding wheel along a line coincident with the edge of a tooth of a cutter being ground, and a combined guard and tooth positioning finger means mounted on said supporting means for said grinding wheel spindle including screw threaded means operable to determine the rotative position of said combined guard and tooth positioning finger means thereon circularly about the axis of said spindle, and other means separately operable to adjust said combined guard and tooth positioning finger means laterally parallel to the axis of said spindle while preserving the rotative position determined by said screw threaded means.

35. In a machine for grinding the teeth of tools such as milling cutters, ball end mills and end mills from an initial basic setting of a cutter to be ground in the machine, a base, a grinding wheel and driving means therefor mounted on said base, a work head adapted to hold a cutter to be ground and supporting means therefor mounted on said base, means for effecting relative movement between the grinding face of said grinding wheel and the tooth of a tool being ground and carried by said work head in a path coincident with the line of said tooth, means for moving said work head and said supporting means therefor about a vertical axial line having a fixed relation to said base and a cutter locating gage element removably positionable on a portion of said supporting means which has a fixed relation to said vertical axial line; said gage element having means indicating the intersection of said vertical axial line with a horizontal plane containing the axis of a cutter held in said work head.

36. A tool grinding machine as claimed in claim 35 in which said tool supporting means including said means for moving said work head and said supporting means about vertical axis is mounted for vertical adjustment on said base.

37. A tool grinding machine as claimed in claim 35 in which said means for moving said work head and supporting means therefor about said vertical axial line includes releasable devices for locking said means at predetermined increments of said movement about said vertical axial line and other means for disabling said releasable devices and for establishing stop limits for the permissible extent of said pivotal movement.

38. A tool grinding machine as claimed in claim 35 in which said cutter locating gage element includes a portion thereof presenting a first vertical surface disposed in a plane intersecting said vertical axial line, a second vertical surface disposed at right angles to said first named vertical surface and intersecting the plane of said first named vertical surface at a point thereon coincident with said vertical axial line and a third surface disposed in a horizontal plane intersecting both of said vertical surfaces in a horizontal line containing the axis of said tool holding means of said work head.

39. In a machine for grinding the teeth of tools such as milling cutters, ball end mills and end mills from an initial basic setting of a cutter to be ground in the machine, a base, means for mounting a wheel head unit on said base; said unit including a grinding wheel mounted on a spindle and power means for driving said spindle; said mounting means including separate devices for moving said unit on said base in transverse directions in horizontal planes, in a vertical line, and about a horizontal axis and a vertical axis, a workhead attaching means adapted to carry a workhead in which a cutter to be ground may be secured, and supporting means for said workhead attaching means carried by said frame and including adjustable means operable to establish a basic setting with respect to a vertical axial line having a fixed relation to said base of a cutter to be ground held by said workhead and further including means permitting pivotal movement of said supporting means and said workhead attaching means as a unit about said vertical axial line and further including manually operated means for effecting adjustment of said supporting means vertically with respect to said base; said supporting means including devices for locking said means against said pivotal movement, and other means for indexing said pivotal movement of said supporting means in predetermined increments of arc.

References Cited by the Examiner

UNITED STATES PATENTS

| | | | |
|---|---|---|---|
| 1,398,187 | 11/21 | Guest. | |
| 1,420,323 | 6/22 | La Rock. | |
| 1,616,056 | 6/35 | Mensforth et al. | 51—94 |
| 2,118,967 | 5/38 | Curtis | 51—225 |
| 2,332,510 | 10/43 | Franzen | 51—225 |
| 2,349,324 | 5/44 | Wiedmann | 51—34.6 |
| 2,360,772 | 10/44 | Hedin | 51—100 |
| 2,362,873 | 11/44 | Wessman | 51—225 |
| 2,401,874 | 6/46 | Kilbride | 51—34.2 |
| 2,482,802 | 9/49 | Sanders | 51—225 X |
| 2,725,690 | 12/55 | French | 51—225 |
| 2,874,517 | 2/59 | Markle | 51—34.3 |
| 2,911,770 | 11/59 | Dawson | 51—219 |
| 2,949,706 | 8/60 | Brady | 51—34.2 |
| 2,958,988 | 11/60 | Crosby | 51—122 |

FOREIGN PATENTS 15,587   9/91   Great Britain.

LESTER M. SWINGLE, *Primary Examiner.*

JOHN C. CHRISTIE, J. SPENCER OVERHOLSER,
*Examiners.*

UNITED STATES PATENT OFFICE
CERTIFICATE OF CORRECTION

Patent No. 3,164,930                      January 12, 1965

Spurgeon Crosby

It is hereby certified that error appears in the above numbered patent requiring correction and that the said Letters Patent should read as corrected below.

Column 7, lines 24 and 25, strike out "This stationary element 116. This shank element 116.".

Signed and sealed this 18th day of May 1965.

(SEAL)
Attest:

ERNEST W. SWIDER
Attesting Officer

EDWARD J. BRENNER
Commissioner of Patents